United States Patent
Daniels et al.

(10) Patent No.: US 6,480,291 B1
(45) Date of Patent: Nov. 12, 2002

(54) FONT MANAGEMENT SYSTEM THAT PROVIDES FOR SYNCHRONIZATION OF FONTS AMONG RESOURCES

(75) Inventors: Andrew M. Daniels, Menlo Park, CA (US); David Opstad, Mountain View, CA (US); Deborah Goldsmith, Los Gatos, CA (US)

(73) Assignee: Apple Computer, Inc., Cupertino, CA (US)

( * ) Notice: Subject to any disclaimer, the term of this patent is extended or adjusted under 35 U.S.C. 154(b) by 0 days.

(21) Appl. No.: 09/303,659

(22) Filed: May 3, 1999

(51) Int. Cl.[7] .............................................. G06K 15/00
(52) U.S. Cl. .................................................... 358/1.11
(58) Field of Search ................................ 358/1.1, 1.11, 358/1.16, 467, 470, 1.2; 400/171, 172, 109, 110, 69, 72; 345/467, 468, 471, 472

(56) References Cited

U.S. PATENT DOCUMENTS 5,167,013 A * 11/1992 Hube et al. ................. 358/1.11
6,252,671 B1 * 6/2001 Peng et al. .................... 358/1.1

OTHER PUBLICATIONS

Press Release, "Diamondsoft Announces Font Sense Technology—Workflow Issues Solved With New Font Identification and Auto Activation Technology", Aug. 31, 1999.

De Laurentis, Michael S., "*Panose 2.0 White Paper*", Hewlett–Packard Document EWC–92–0015h, Dec. 16, 1993, pp. 1–33.

* cited by examiner

*Primary Examiner*—Arthur G. Evans
(74) *Attorney, Agent, or Firm*—Burns Doane Swecker & Mathis, L.L.P.

(57) ABSTRACT

A font synchronization system ensures that fonts which are specified in the creation of a document are the same as those that are employed in the subsequent handling and printing of the document. Each font that is utilized within a document, or available in a printing system, is characterized by a font reference that unambiguously identifies significant features of the font. Font references associated with a document are compared with those available on a computer resource, to see if two fonts are the same in all significant respects. If the fonts are not the same, the comparison process identifies the areas of difference between them, so that a determination can be made whether such differences are critical to the appearance of the document. A number of font references are encapsulated within a font profile, to identify the fonts that are available for use within a particular environment, such as a service bureau. The font profiles can be employed by document creators to limit their choices for fonts to those which will be ultimately available when the document is printed.

32 Claims, 6 Drawing Sheets

| Tag | Relevance | Method |
|---|---|---|
| kern | 101000 | Equality |
| hmtx | 011000 | Equality |
| type | 000100 | String Match |
| | | |

TABLE 1

FONT MANAGEMENT SYSTEM THAT PROVIDES FOR SYNCHRONIZATION OF FONTS AMONG RESOURCES

FIELD OF THE INVENTION

The present invention is directed to the management of character fonts in computer systems for the creation and printing of documents, and more particularly to a system that provides for the synchronization of fonts among different computing and printing resources.

BACKGROUND OF THE INVENTION

As document publishing technology has transitioned from the use of metal print type to more modern computer-controlled printing systems, such as laser printers, the typeface designs that are available to publishers and other document creators have increased dramatically. As a result, a large variety of fonts can be employed within a publication, and even within a single article, to create a unique appearance and/or draw the reader's attention to particular subject matter. However, the wealth of fonts that are now available for use creates its own set of problems, namely the management of a large number of fonts among the various systems in which they are used.

One particular concern in this area is the fact that the same document content may be handled by different computer systems at different times during the publishing process. For example, the various articles of a publication may be originally created and laid out at a publisher's facilities. Due to the need to optimize space on individual pages and throughout the overall publication, the particular font types and sizes that are chosen by the publisher can be quite critical to achieving a desired appearance. Once the layout of the publication has been completed, it might be transferred to a prepress operator, who evaluates the publication for any potential problems before it goes to press. From there, the publication is sent to a service bureau, which is responsible for printing and assembling the pages of the publication. It is necessary for the prepress operator and the service bureau to employ the same fonts as those selected by the publisher, to ensure that the printed pages are the same as those which appeared on the publisher's computer monitors while the publication was being laid out. If these facilities do not have the same fonts as those selected by the publisher, there may be an attempt to substitute other fonts which have a similar name and/or appearance. However, if all of the characteristics of the substituted font do not match those of the originally selected font, adverse consequences could result. For instance, if the spacing between characters is different in the original font and the substituted font, a reflow of text might occur, wherein words wrap around to succeeding lines of an article at different points from the original layout. In such a case, the number of lines in an article could change, resulting in blank spaces if the number of lines is reduced or, more seriously, missing lines if the number increases. Changes of this nature can prove to be very expensive if they are not identified sufficiently early in the publishing process.

There are a variety of different ways in which mismatches can occur between the fonts selected by various computer systems involved in the layout and printing of a document. Typically, a naming convention is employed for font selection. However, two fonts may have the same name, but they might be of different types. For instance, two well-known font types are Type 1 fonts, which conform to the PostScript page description language, and TrueType fonts, which are designed to appear the same on both a computer monitor and a printed page. Often the same name is employed for a font of one type whose glyphs, e.g. character designs, have the same appearance as those of the other type. Even though two fonts have the same name, e.g.,"Times", the metrics that are associated with them may be different. If a Type 1 font is substituted for a TrueType font, or vice versa, reflow of text could occur.

Even if different workstations which handle a document are using the same type of font, different versions may be employed. For instance, the publisher may adjust some of the metrics associated with a font, in order to obtain a particular result. One situation of this type can occur when the kerning, i.e., the spacing between individual characters, is adjusted, to fit a line of text within a designated area. If the prepress operator or the printing bureau do not employ this same adjustment, reflow of text can again occur.

These types of experiences are not limited to the publishing industry. They can even occur within a single computer system. For instance, some computer systems place a limit on the number of files that can be open at any given time. If a document requires access to a particular font, the printer driver may not be able to obtain the font because of the open-file limit. In such a case, the driver might substitute another font which is already open, or a bitmap version of the requested font. Such a change can result in wasted output, and hence unnecessary expense.

To solve the problems that are associated with these situations, a font management utility should be able to ensure that the fonts which a user specifies in a document are the same as the fonts that exist on the computer system in which that document is opened, as well as on a printer when that document is printed. To this end, therefore, the font manager should be able to identify a font on the basis of information which is more specific than just the name and/or type of the font.

In the past, different approaches have been employed in an effort to identify the relationship between fonts. For instance, the Panose typeface classification system categorizes fonts on the basis of their visual appearance. Generally speaking, in this system a number of digits are associated with a font. Each digit pertains to a different visual characteristic of the typeface, and its value is based upon the subjective judgment of the typeface designer. For example, the digits might fall within a range of −10,000 to 10,000, and if the designer considers the character strokes to have a medium thickness, or weight, he could assign a value of zero for the weight digit, to indicate a normal thickness. The objective of this type of system is to facilitate font substitution, by permitting users to identify a font whose visual appearance is closest to that of a particular font of interest, based upon human interpretations. However, it does not take into account the physical layout of the font, and therefore is not capable of avoiding problems associated with the layout of text, such as reflow.

Other types of font identification systems employ a more objective identifier. For instance, some systems compute a digital signature that is based upon the entire contents of a font file. When a font is to be employed in connection with a document, its file's digital signature is computed and compared against that of the original font. If the two digital signatures do not match, this provides an indication that the files differ in some respect. However, since the digital signature is only reflective of the file in its entirety, it does not identify where the difference lies, and consequently the user is not able to determine whether the difference is significant. For instance, two font files may contain the same data, but the ordering of the data may be different. Such a difference may not cause text reflow, and therefore the user may consider the two fonts to be the same. Unfortunately, the digital signature does not provide information which enables such a determination to be made. It only identifies the fact that the two files are somehow different. If two fonts are not the same, the font management utility should be able to identify tie nature of the differences, so that the user can make an informed decision whether to employ a particular font, or choose a different one.

SUMMARY OF THE INVENTION

In pursuit of the foregoing objectives, the present invention provides a mechanism for characterizing a font in a manner that unambiguously identifies significant features of the font. This characterization is used to compare different instantiations of a font, e.g. one specified by a document creator and one which exists on a workstation or a printer, to see if the two fonts are the same in all significant respects. If the two fonts are not the same, the comparison process identifies the areas of difference between them, so that a decision can be made to employ a particular font on the basis of whether the detected differences are critical to the appearance of a document. By means of such an approach, document creators, handlers and printers are able to verify that their respective versions of a font are synchronized with one another, as well as the degree to which such synchronization exists.

One primary component of a system which is based upon the foregoing principles is a font reference. In essence, the font reference is a data structure containing objective information which is derived from the intrinsic data of the font and which forms an unambiguous reference to a specific font. This information may include the type of font, its version, changes which affect its metrics, and the like. A font reference can be stored together with the contents of a document, and transmitted with the document over a network or the like. Upon receipt at a host system, the reference can be used to identify an actual font available at that system to be employed in the handling or printing of a document.

Another component of a system which embodies the present invention is an application programming interface for constructing and matching font references. Upon receiving a font reference with a document, the interface iterates through each of the fonts that are available on a host system, and matches their font references against the received font reference. From the resulting comparisons, the interface identifies one or more matching font references, and converts them into the identification of actual fonts on the host system, for use in viewing or printing the document.

Another feature of the present invention comprises font profiles. A font profile contains a collection of font resources for a particular environment. For instance, a font profile that is associated with a document could identify each of the fonts employed within that document. A font profile for a host system identifies all of the fonts that are available for use in that system, and can be employed as a filter by a document creator, to limit document fonts to those which are available at the host system.

The foregoing features of the invention, and the advantages offered thereby, are described in greater detail hereinafter with reference to specific embodiments of the invention illustrated in the accompanying drawings.

DETAILED DESCRIPTION

To facilitate an understanding of the present invention, it is described hereinafter with reference to its implementation in specific embodiments. In particular, references are occasionally made to font system features which are associated with the Macintosh Operating System distributed by Apple Computer, Inc. Furthermore, the invention is described in connection with the manner in which it might be employed in the publishing industry. It will be appreciated, however, that the practical applications of the invention are not limited to these particular examples. Rather, the principles which underlie the invention can be applied to any type of system in which there is a need to synchronize fonts that are employed by different computer resources.

Figure 1:
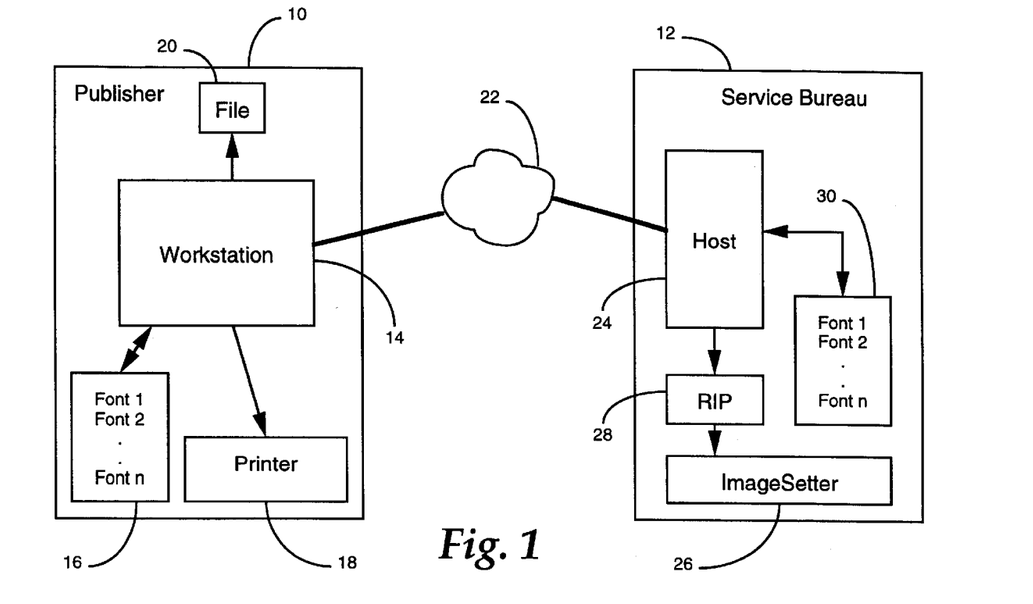
FIG. 1 is a block diagram of exemplary publishing environment in which the present invention can be employed.

One example of an environment in which the present invention might be employed is illustrated in the block diagram of FIG. 1. This example depicts a relatively simple situation in which the content of a document, such as a magazine, is created by a publisher 10 and then forwarded to a service bureau 12 for the final printing of the magazine. Some of the content of the magazine, such as the text of articles, may be created at the publisher's site, and other portions of the content may be imported from other sources, such as photographs and advertisements. Once all of the various components of the magazine have been assembled, they are laid out by a designer, to create the final appearance of the publication. These functions might be performed by means of a desktop publishing program running on the designer's workstation 14. In the course of creating the layout, the designer might apply various fonts to different components of the magazine, to enable them to fit into applicable layout space as well as conform to a particular style. These fonts are typically stored in one or more files 16 on the designer's workstation, for example as part of its operating system. At various stages of the design process, the pages can be printed for proofing by the designer. Typically, printers 18 at the publisher's site might be inexpensive printers having relatively low resolutions in the range of 300–600 dots per inch (dpi).

Once the layout of the publication has been completed, it is saved in a file 20 that is forwarded to the service bureau for final printing. The transmission of the file to the service bureau could take place over a network 22, for example, or it can be stored on a transportable disk that is shipped to the service bureau.

At the service bureau, the received file is processed within a host system 24 and printed on a high resolution printer 26 known as an imagesetter. The imagesetter prints the publication on resin-coated photographic quality paper at a resolution in the range of 1200–2500 dpi. In the process of printing the publication on the imagesetter, the individual pages are rasterized, i.e., transformed into bitmapped information, by means of a raster image processor 28. The rasterization of the textual characters on a page is carried out with reference to font information 30 that is stored on the host processor 24.

As discussed previously, problems can arise if the fonts 30 that are employed at the service bureau 12 to print the publication are not the same as the fonts 16 which were selected at the publisher's site 10 during the design of the publication. As an example, the publication designers may have employed TrueType fonts, which are designed to have the same appearance when displayed on a screen as they do in a printed document. Thus, when the designer prints a page of the publication for proofing purposes on the local printer 18, it will appear the same as it did on the monitor of the workstation. In some instances, however, a raster image processor 28 is not able to properly render TrueType fonts. In such a case, a font with the same name but of a different type, e.g., a PostScript Type 1 font, might be substituted for the originally designated TrueType font. Although the two fonts may have the same name, their individual characteristics may differ, particularly with respect to the metrics and kerning of various characters. As a result, a reflow of text might occur, disrupting the original layout that was designed.

It should be noted that the example depicted in FIG. 1 is a relatively simple case, for illustrative purposes. In practice, the document might be handled at a number of different workstations in the publisher's site 10, where each workstation is responsible for a different aspect of the publication. Furthermore, it might be forwarded to a prepress house prior to being sent to the service bureau 12, for evaluation of its layout and to detect potential problems. At each of these various stages in the handling of the document, it is necessary that the same font be employed, or adverse consequences could result.

To overcome these types of problems, the present invention provides a mechanism for synchronizing the fonts that are employed at each of the various computer resources that are involved in the creation, handling and printing of the publication. A general overview of this mechanism is illustrated in the block diagram of FIG. 2. Generally speaking, data which pertains to one of the fonts from the file 16 that was employed in the creation of the document is used to generate an unambiguous characterization of that font. In accordance with the invention, that characterization comprises objective information that is derived from the intrinsic data of the font itself, such as checksums of metric and kerning data pertaining to the font. In operation, therefore, pertinent data 32 for a particular font is provided to a checksum engine 34. This engine processes the data to generate checksum values and, in some instance, text strings. The resulting information forms a representation known as a font reference 36. A separate font reference is generated for each font that is employed within the publication, and these font references are provided to the service bureau along with the file 20 describing the contents of the publication.

Figure 2:
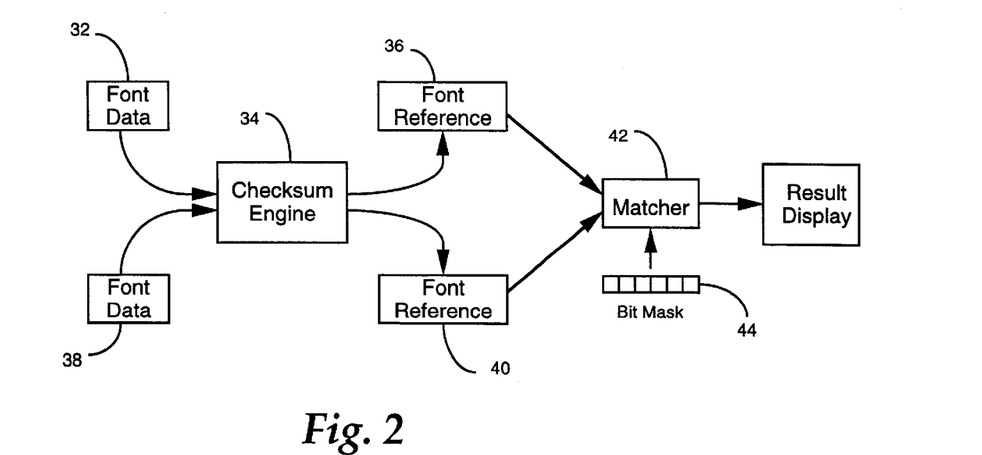
FIG. 2 is a block diagram overview of the system of the present invention.

At the service bureau, a font reference is generated for each of the fonts that is available for the printing of the publication. As illustrated in FIG. 2, font data 38 for a service bureau font is presented to a checksum engine 34, to generate the font reference 40 for that font. Although FIG. 2 illustrates the same checksum engine is employed for both the document's font data 32 and the service bureau's font data 38, in practice separate engines which are respectively located at the publisher's site 10 and the service bureau 12 would be utilized. The font reference 36 associated with the publication is compared with the font reference 40 for a font available at the service bureau, in a matcher 42. The matcher provides an indication whether a received font reference 36 matches a font reference 40 for one of the service bureau's available fonts. As explained in greater detail below, the function of the matcher is preferably implemented by a suitably programmed computer, such as the host processor 24. For example, the matcher might be loaded into the memory as a component of a font subsystem which forms part of the host processor's operating system. The checksum engine 34 can also form part of the font subsystem.

As a further feature of the invention, the degree to which the data in two font references must correspond to one another, to be considered a match, can be specified by the user. Depending upon the circumstances, it may not be necessary for every item of data that is used to characterize a font in a font reference to have an exact match in another font reference. For instance, if all of the metrics associated with two fonts correspond to one another, the user may not care whether the two fonts are of the same type or different types. In such a case, the user can specify that the metric data is critical, but the type data is not. Such an indication can be made by way of a bit mask 44. In the bit mask, each bit corresponds to one category of the data that is used to characterize the font. The settings of the individual bits identify which elements of data are critical for a particular application. The bit mask can be provided to the service bureau along with the font reference 36 that is supplied with the publication. The matcher 42 employs this bit mask to perform the comparison and provide an indication whether two font references match one another with respect to those categories that are deemed to be important.

Figure 3:
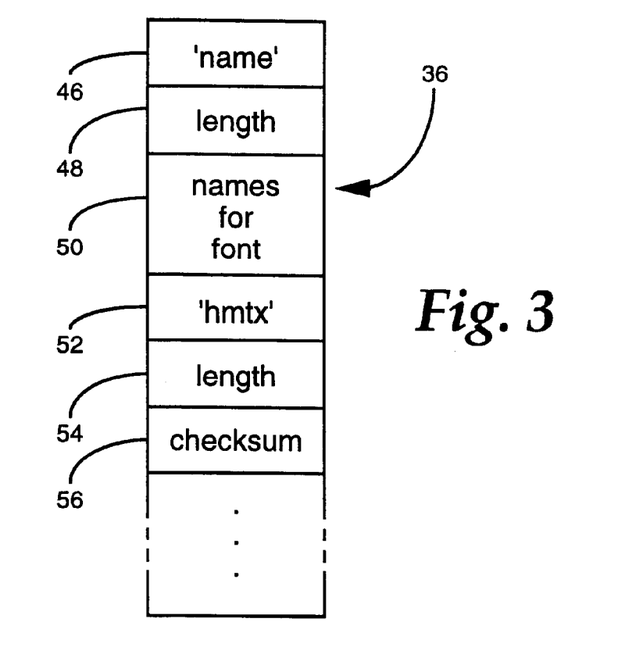
FIG. 3 is an illustration of an exemplary font reference data structure.

An exemplary structure for a font reference 36 is illustrated in FIG. 3. Generally speaking, a font reference can be viewed as a list of properties that characterize a font. Some of the properties that can be used to characterize a font include its name, metric data (which contains specifications for a typeface such as the thickness of an underline, the width of characters, the thickness of strokes, the size of capital letters, etc.), the kerning table that describes the spacing between letters, the technology type of the font, (e.g., Type 1, TrueType, bitmap, etc.), encoding, and the like. Each property has a data type associated with it. Some of the elements of data can be relatively short, such as the name of the font or its technology type, and the data type that is stored in the font reference can be a text string to identify that property. For properties that contain more elaborate sets of data, such as a kerning table, a checksum is computed from the data and stored in the font reference as the relevant data type.

The data that is used to construct the font reference is obtained from the definition of the font itself. Typically, a font is stored on a computer in the form of tables. Each table contains data pertaining to an aspect of the font, such as character mappings, glyph outlines, horizontal metrics, kerning, and the like. For example, in the Macintosh Operating System, the data in each table is expressed in a sequence of binary words which conform to specified data types. These tables contain the font data 32, 38 that is provided to the checksum engine by the computer's font subsystem. The checksums of the binary words, or in some cases the binary words themselves, form the contents of the font references. In other words, the data in the font reference is directly and objectively derived from quantifiable properties of the font itself, rather than being based on a subjective determination.

In the example of FIG. 3, the first element of information in the font reference is the font name. Within the font reference data structure, three fields are associated with this data type. The first field 46 contains the title, or tag, of the data table, in this case "name", and the second field 48 identifies the length of the next field 50 which contains the actual data. Since a font might have one or more names associated with it, it is desirable to store all of the names of the font in the font reference. Consequently, the data field 50 could be of varying length, which is specified in the length field 48.

The next piece of identifying data in the exemplary font reference of FIG. 3 is the horizontal font metrics, whose table has the tag "hmtx". Since the total number of metrics associated with a font, as well as their individual values, can vary over a wide range, it is preferable to use a checksum to characterize this data. Accordingly, the data for the metrics is stored within the font reference by means of a title field 52, a length field 54, and a checksum field 56 containing a checksum of all of the metric data in the hmtx table for the font. In a similar manner, all of the other elements of characterizing data are stored in appropriate fields of the font reference 36.

The checksums that are stored in the font references for various properties can be computed by means of any known algorithm for generating checksums. Preferably, the algorithm should be sensitive to transposition of data elements, as well as be able to identify a change of a single bit. One category of algorithms that are appropriate for this purpose are one-way hash functions. Examples of known and available hash functions that are suitable for use in the context of the present invention include Snefru, MD5 and Tiger.

In practice, if the same algorithm is used to compute each of the checksums, then each of the data fields for these types of data will have the same length. In such a case, it may not be necessary to include a length field 54 for each data type that is represented by a checksum, thereby reducing the size of the font reference. However, in the event that new data types may be added to the font reference over time, it is preferable to maintain the length fields in the data structure. With this approach, when a new data type is not recognized by an older version of the technology, the length field permits the matcher to skip over the data fields that are not recognized, rather than having to parse through the data.

Figure 4:
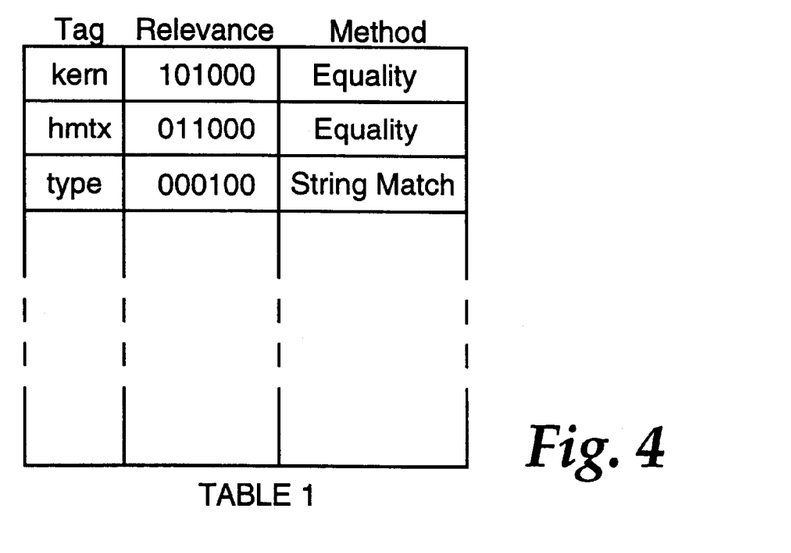
FIG. 4 is an illustration of a lookup table which identifies the relationship between user-selected options and associated properties.

The operation that is carried out in the matcher 42 to compare two font references to one another is explained with reference to FIGS. 4 and 5. As described previously, in a preferred embodiment of the invention, the user is provided with the ability to select those features of a font which are significant for a given application. Each of the options that is available to the user is represented by one of the bits in the bit mask 44. For each such option, one or more of the properties whose data is stored within the font reference may be applicable. The relationship between the options that are selectable by the user and the properties contained within the font reference are stored in a lookup table, illustrated in FIG. 4. This lookup table contains three columns of information. The first column identifies each of the various tags that are employed in the font reference. The second column identifies whether a tag is relevant to a particular option that can be selected by the user. The data in this column corresponds to the bit mask 44 that is provided to the matcher. As noted previously, each bit in the bit mask relates to a respective option that can be selected by the user. In the table of FIG. 4, the respective bits are set to a value of one if the data for a tag is relevant to the corresponding option. Hence, in the example of FIG. 4, the "kern" data is relevant to the first and third options represented in the bit mask, and the "hmtx" data is relevant to the second and third options.

A third column in the table of FIG. 4 identifies the operation that is to be performed on the data for each tag to determine whether a match exists. For example, an "equality" method might be specified for tags that are represented by a checksum, to indicate that the checksum values within two font references must be equal to one another for a match to occur. For tags that are text strings, the associated method might be "string match", or the like. A string match method might be satisfied if at least one word is the same in each of two fields being compared, even if all of the words don't match, to accommodate the situation where a font has more names in one system than it does in another. The particular method that is employed to determine a match is related to the type of data stored in the font reference for a given tag.

Figure 5:
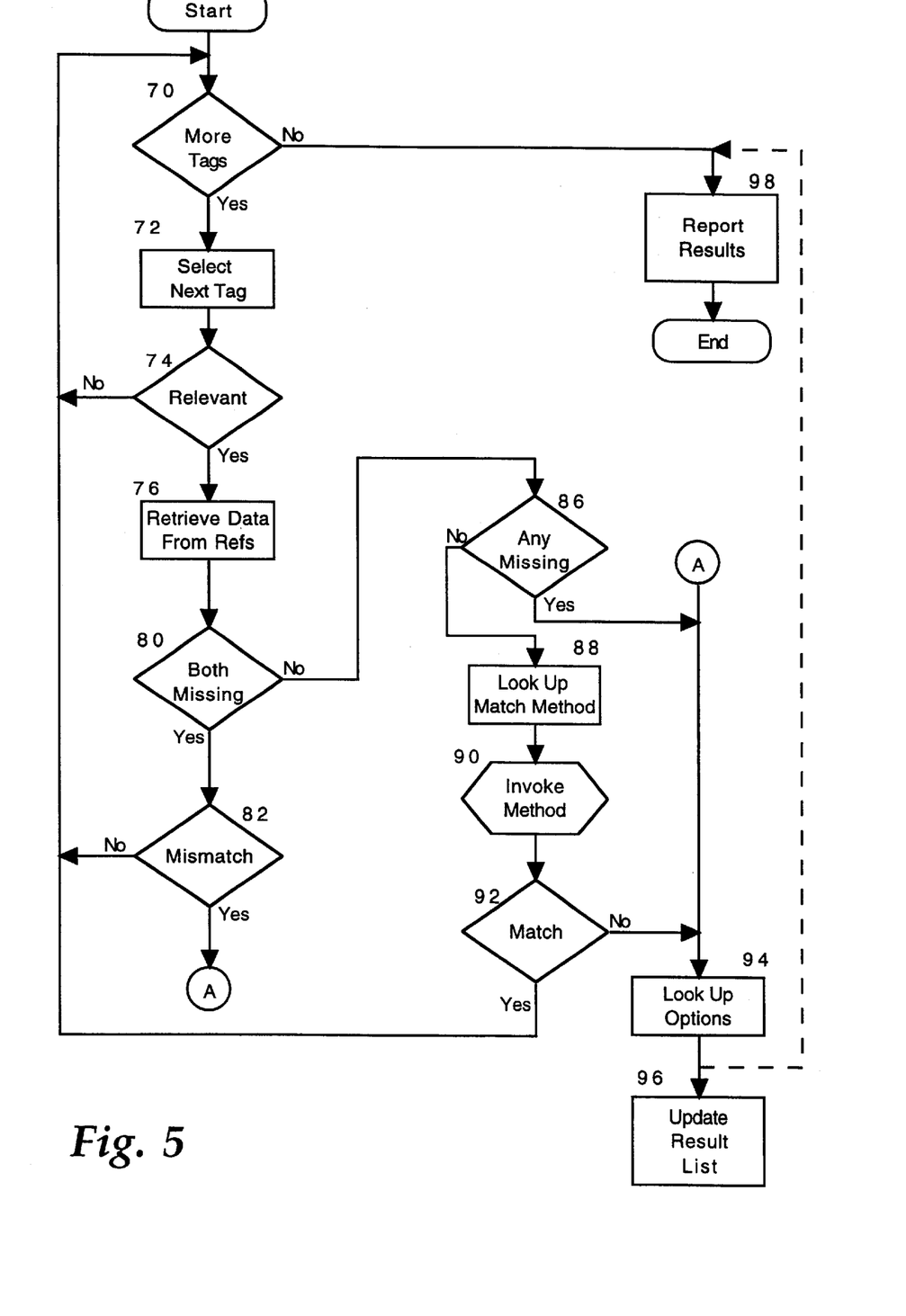
FIG. 5 is a flowchart of the procedure for matching two font references against one another.

FIG. 5 is a flowchart which illustrates the basic procedure that is carried out by the matcher 42 to compare two font references to one another. In general, the procedure iterates through each of the tags in the table of FIG. 4, to determine whether it is relevant to the options which have been selected by the user. For each tag which is relevant, the values in the two font references are compared. At the outset, therefore, the procedure determines at step 70 whether there are any tags in the table of FIG. 4 to be evaluated. At the beginning of the procedure, of course, none of the tags will have been evaluated, so the first tag is selected at step 72. A determination is made at step 74 whether the selected tag is relevant to the options selected by the user. This determination is made by comparing the bits in the bit mask 44 to the bit sequence in the second column of FIG. 4 of the tag, e.g. by means of a logical AND operation for each bit position. If at least one set bit in the table matches a set bit in the bit mask, the tag is deemed to be relevant. If none of the bits match, the tag is irrelevant, and the process returns to step 70 to select the next tag from the table.

When a relevant tag is identified, the pertinent data for that tag in each of the two font references is retrieved at step 76. It may be the case that one or both of the font references do not contain the pertinent data. For instance, the number of different properties that are stored in a font reference may increase over time, as subsequent versions of the font synchronization system are released. Consequently, a font reference that was created with an early version of the system may not contain a particular property that is subsequently associated with one of the selected options. At step 80 the matcher determines whether the relevant data is missing from both of the font references. In one embodiment of the invention, the user can set a preference item to indicate whether the lack of data in both font references is to be treated as a mismatch. The user's choice is detected at step 82. If the lack of data is not considered to be a mismatch the process returns to step 70, to retrieve the next tag on the list. If the missing data is treated as a mismatch, the procedure jumps to step 94, which is described in detail hereinafter. If the pertinent data is not missing from both of the font references, a determination is made at step 86 whether it is missing from either of the two font references. If the data is present in both font references, a lookup operation is carried out at step 88, to identify the appropriate matching method from the third column in the table of FIG. 4. This method is then invoked at step 90, and a determination is made at step 92 whether there is matching data in the two font references for the selected tag. If so, the process returns to step 70, to select the next tag that is to be evaluated. This procedure continues in an iterative fashion until a mismatch occurs, or all of the tags results in a successful match.

If a match failure is detected at step 92, a lookup operation is carried out at step 94, to identify the option(s) associated with the tag for which there was a mismatch. For example, a separate table (not shown) can identify the user-selectable option that is associated with each bit position in the bit mask 44. When a mismatch occurs for a given tag, the bit sequence for that tag is checked in the "Relevance" column of FIG. 4, and for each bit which is set to a value of one, the corresponding option is identified. Alternatively, the options associated with each tag can be directly stored in the table of FIG. 4, for immediate retrieval upon the occurrence of a mismatch. Each identified option for which there was a mismatch is stored in a list, at step 96. The process then returns to step 70, to check all of the remaining tags.

If a determination is made at step 86 that the pertinent property data is missing from one of the two font references, then a match operation cannot be carried out on that data. In the illustrated embodiment of the invention, this situation is treated as a match failure. Accordingly, an affirmative decision at step 86 causes the matcher to proceed to step 94, where it identifies the option associated with the non-matching data, and adds this option to the list at step 96. In an alternative embodiment of the invention, the absence of data for a particular tag in one of the font references can be treated simply as an unmatchable property, and the process returns to step 70, similar to a negative decision at step 82.

Once a determination is made at step 70 that all of the tags in the tag list have been checked, a report is generated at step 98. If any match failures have been detected, the report identifies each option for which there was a failure, from the list generated at step 96. However, if every relevant tag resulted in a successful match, i.e. the failure list is null, the report indicates that the two font references match one another. The report might be displayed to the user on the monitor of a workstation, for example.

In the embodiment of the invention illustrated in FIG. 5, all of the tags associated with the selected options are checked, and the resulting report indicates those options for which a match failure occurred. Based on this information, the user can make a decision whether the specific options that failed to match are critical to a particular application. If the failure occurred in an area that is inconsequential, the user might decide to proceed with the printing of the document in any event, using the font that was tested for a match.

In an alternative embodiment, any failure to match can be considered to be critical. In this embodiment, once the first match failure is detected at steps 82, 86 or 92, the process can proceed directly from step 94 to step 98, as represented by the dashed line, to generate a report that a mismatch has occurred. In this case, the checking of all of the remaining tags in the table of FIG. 4 can be avoided.

In a further aspect of the invention, a number of font references that pertain to a particular setting are grouped together in a structure that is labelled a font profile. For example, a font profile can be generated for all of the fonts contained within a particular publication. When the publication's file is transmitted to the service bureau for printing, the font profile provides the prepress operator with a convenient mechanism to identify fonts available at the service bureau which correspond to those used in the publication.

The service bureau can also generate a profile of the fonts which are available at its site and provide these to publishers and other customers. With this information, document creators can constrain the fonts which they employ to those that are available at the service bureau, to minimize the possibility of non-matching fonts. The service bureau can regularly publish an update of its font profile, for example by posting it on an internet web site, so that customers will have current information about the fonts to be employed.

In another example, some publishing systems store a run-time cache of fonts that are being used in a document, for comparison against those which are available on the current computer system. The font profile provides a convenient data structure for such a purpose.

Figure 6:
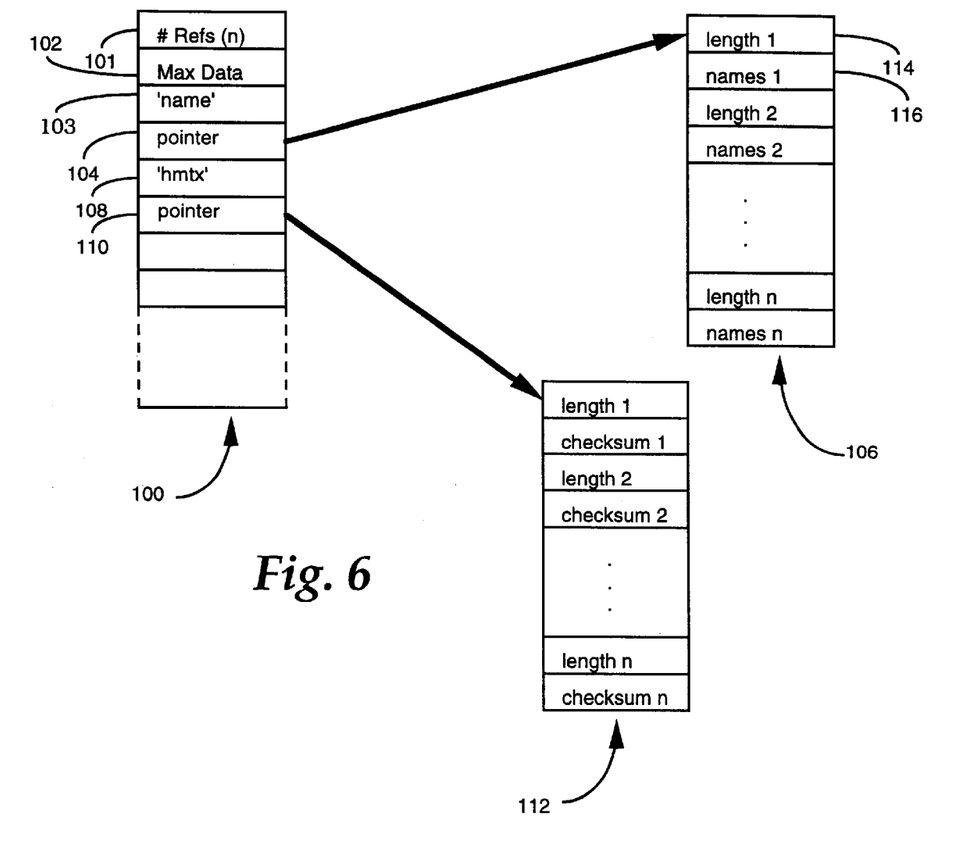
FIG. 6 is a block diagram of a font profile data structure.

The configuration of a font profile is illustrated in FIG. 6. In essence, a font profile consists of a list of font references. To provide more efficient operation, however, the data contained in a font profile is organized according to data type, i.e. properties, rather than as a sequential list of font references. The top level structure in the font profile is a directory 100. The first field 101 in the font profile directory indicates the number of font references, n, contained in that profile. The next field 102 indicates the maximum amount of data that is contained in any of the entries of the font profile. Providing this information in the font profile directory permits a buffer of appropriate size to be allocated at the beginning of a matching process, and eliminates the need for subsequent memory allocation to accommodate increasing amounts of memory.

Following the reference number and maximum data entries, a field 103 contains the title of the first data type contained in the profile, in this case "name". The field 104 which follows is a pointer to a table 106 which contains the name data for all of the font references in the profile. The data for each font that is represented in the font profile can be accessed by an index value, i, that is associated with the font. The data for the respective fonts is stored in each table in a sequential manner, in order of their corresponding index values. In the name table 106, therefore, all of the name data for Font 1 is stored in the first entry of the table, the name data for Font 2 is stored at the second entry in the table, and so on.

The next field 108 in the directory 100 identifies another data type, "hmtx", followed by the pointer 110 to a table 112 for that data type. This table contains a sequential listing of the horizontal metrics checksum values for Fonts 1 through n.

As discussed previously, the information associated with some of the data types can be of variable length. For instance, since a font can have multiple names, and the names themselves can be of indeterminate length, a variable length table is employed for these data types. The table 106 for the "names" data type illustrates an example of a variable length table. In this type of table, two fields are associated with each font reference, namely a length field 114 and a data field 116. In the illustrated example, each data field 116 contains all of the names for its associated font, and the length field 114 indicates the total length of the data field, e.g., the number of bytes contained in it.

In the case of tables which contain checksum data, such as table 112, all of the checksums will have the same number of bits, since they are all computed by the same algorithm. It is possible, therefore, to do without length fields in such a table, since every entry has the same length. However, it is preferable to include a length field in the checksum data tables as well, to provide backward compatibility as discussed previously.

The font profile provides the ability to identify one or more fonts, out of a large number of available fonts, which match a given font reference. For example, when a service bureau receives a font reference pertaining to a document to be printed, that font reference can be compared against the profile of all of the fonts available at the service bureau, to select the font which is most appropriate for the printing of the document. To do so, a list of candidate fonts is generated, and the candidates are then examined, on a tag-by-tag basis, to selectively remove those candidates which do not match the font reference of interest.

Figure 7:
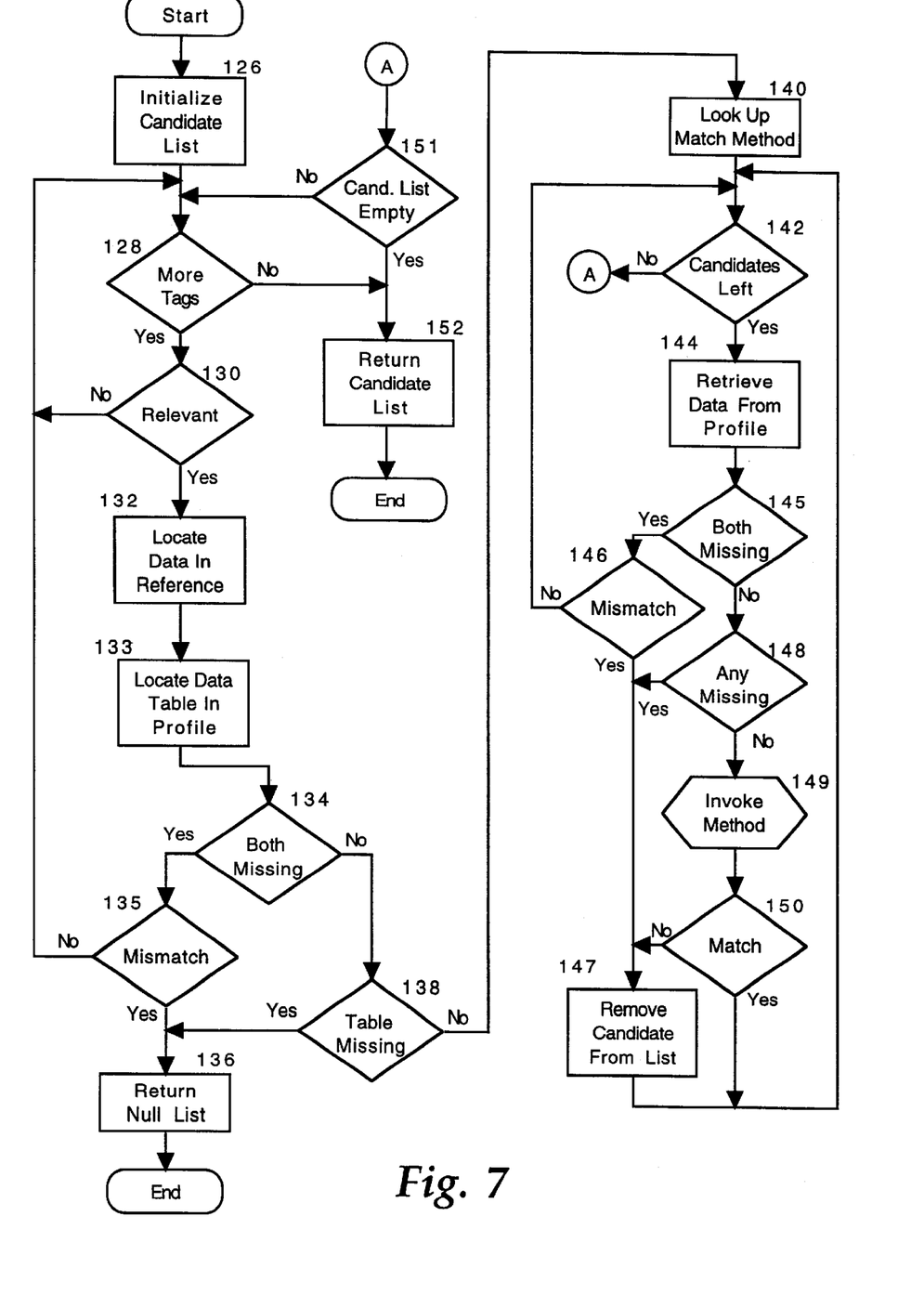
FIG. 7 is a flowchart of the procedure for matching a font reference against a profile.

One embodiment of a procedure for identifying an available font which corresponds to a given font reference is illustrated in the flow chart of FIG. 7. This embodiment begins by generating an initial list of candidate fonts, at step 126. This list contains a set of indices, e.g. 1 through n, which respectively correspond to the fonts that are represented in the profile against which the received font reference is to be compared. If the procedure of FIG. 7 is being carried out at a service bureau, for example, the candidate list would pertain to all of the fonts which are available at the service bureau. An index value in the list identifies the location of the data for a given font in each of the font profile tables.

Once the candidate list has been generated, the tags are individually evaluated against the data stored in the profile, on an iterative basis, to identify one or more candidates which match the font reference. At step 128, the tags in the table of FIG. 4 are individually selected, to be evaluated. To optimize the matching procedure, the tags in the table are ordered in accordance with the probability that a failure to match will occur on the basis of a given tag. Based on empirical data, for instance, it might be determined that a mismatch based on metric data occurs much more frequently than one based on font type. By arranging the tags in order of decreasing probability, those which are most likely to result in a match failure are selected first in the matching process. Hence, if there is a mismatch between two fonts, it is more likely to be detected earlier in the process. Once a candidate is determined not to match, it can be removed from further consideration, so it is preferable to remove candidates as early as possible in the process. The ordering of the tags also results in a more efficient operation for the alternative embodiment of FIG. 5 (depicted by the dashed line), since early detection of a mismatch allows the process to terminate sooner.

At the first iteration of the process depicted in FIG. 7, the first tag in the list is selected. In a manner analogous to the procedure of FIG. 5, the selected tag is checked at step 130, to see if it is relevant to the user-selected options. If not, the next tag is selected at step 128. When a relevant tag is chosen, the data which pertains to that tag is retrieved from the font reference at step 132, and the profile is searched at step 133 to locate the data table which corresponds to the selected tag. A determination is made at step 134 whether the data is missing from both the font reference and the font profile. If the appropriate data is not contained in either of the font reference and the profile, a user preference is checked at step 135 to see if this situation should be treated as a mismatch. If it is not, the process returns to step 128 to select the next tag.

If, however, the preference item indicates at step 135 that the lack of data for the tag in both the profile and the font reference is to be treated as a mismatch, then it is not possible for any of the fonts in the profile to match the data that the user has identified as relevant. In such a case, a null list is generated at step 136, and returned to the user, to indicate that a matching font cannot be found on the basis of the data specified by the user. At this point the matching procedure ends.

If the appropriate data is not missing from both the font reference and the profile, a determination is made at step 138 whether the appropriate data table is missing from the font profile. If it is, this situation is considered to be a mismatch, and a null list is returned at step 136, where the process ends. If the appropriate data table is found in the font profile at step 138, the method to be used to examine that data is obtained from the table of FIG. 4 at step 140.

Each entry in the selected data table relates to a corresponding one of the candidate fonts. At steps 142–150, the process steps through the entries in the data table, to identify those which match the data in the font reference. If an entry in the data table does not match that of the font reference, the index of its location is removed from the candidate list, so that data pertaining to its corresponding candidate font need not be evaluated for subsequent tags. The first step, therefore, is to examine the candidate list at step 142, to identify a candidate font which has not yet been evaluated for the selected tag. The index number for the next unevaluated candidate is selected, and the data at the indexed location is retrieved from the appropriate profile table, at step 144. A check is made at step 145 whether data for the selected candidate is missing from both the data table and the font reference. It may be the case that, even though the table was determined to be contained within the profile at step 138, data for a given candidate may not be stored in the table. For instance, the font reference for that candidate font may not have been updated since the table was added to the profile. If the data is missing from the table for that candidate and is also missing from the font reference, the user preference item is again checked at step 146. If that situation is to be treated as a mismatch, the candidate is removed from the list at step 147. If it is not considered to be a mismatch, the next candidate is selected at step 142.

If the data is not missing from both the font reference and the profile data table, a check is made at step 148 whether it is missing from either of these structures. If so, this situation is treated as a mismatch, and the candidate is removed from the list at step 147.

If the appropriate data is present in both the font reference and the profile data table, the match method is invoked at step 149 to determine whether the tag data for the selected candidate matches that of the font reference. If a match is successfully detected at step 150, the process returns to step 142, to select the next index location to be evaluated. If, however, a failure to match is detected at step 150, the index is removed from the list at step 147, and the procedure then returns to step 142, to examine the next candidate on the list. Consequently, in steps 142–150, each candidate on the list has its data for a selected tag compared against the corresponding data in the font reference, and those which do not match are removed from the list.

Once all of the candidates have been examined relative to the first tag the inquiry at step 142 will indicate that there are no candidates left to be examined for the selected tag. A determination is then made at step 151 whether the candidate list is empty, i.e. there were no successful matches for that tag. If that is the case, a null list is returned at step 152. If the candidate list is not empty, the process returns to step 128, to determine whether there are further tags remaining to be matched. If so, the procedure of steps 130–150 is repeated for each tag, and candidate fonts whose data does not match that of the font reference have their indices removed from the list.

Eventually, all of the relevant tags in the tag list will be examined against the fonts remaining in the candidate list. When there are no further tags to be examined, as determined at step 128, the candidate list is returned at step 152. This list contains the indices of the font references in the profile which match the received font reference, relative to the options specified by the user. If the list is empty, a notice can be displayed to the user to indicate that there is no matching font available.

In the embodiment depicted in FIG. 7, the candidate list is generated at the initialization of the procedure, and then each relevant tag is checked against this list. In an alternative embodiment, the initialization step 126 can be eliminated by dynamically constructing the candidate list during the first iteration through steps 142–150. In this approach, the process begins with an empty list. As the first relevant tag is being evaluated, each successful match at step 150 causes the selected candidate to be added to the list. For all subsequent tags, an unsuccessful match causes the selected candidate to be removed from the list, as in the procedure of FIG. 7.

Figure 8:
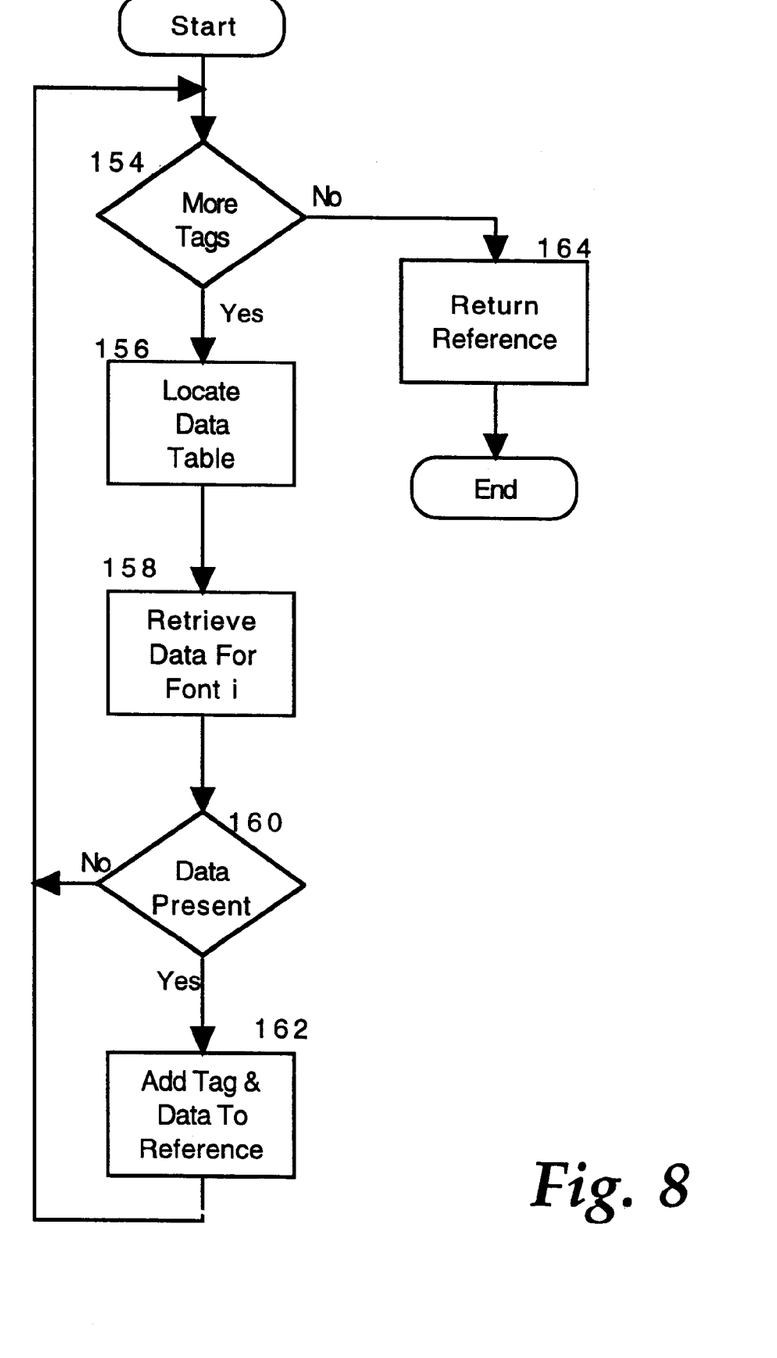
FIG. 8 is a flowchart of the procedure for reconstructing a font reference from a returned index.

The indices that are contained in the returned candidate list can be used to reconstruct the font references for the matching candidates. This procedure is illustrated in the flowchart of FIG. 8. The input data for this procedure comprises the font profile and an index, i, from the returned list. At the onset of the procedure, the first tag in the table of FIG. 4 is selected at step 154. The data table pertaining to that tag is located in the profile, at step 156. The index, i, is then used at step 158 to find the data for the corresponding font in the table. At step 160 a determination is made whether any data is present for that index value. If so, the tag and the data retrieved from the table are added to a font reference data structure being constructed, of the type shown in FIG. 3. If no data is present in the table, the process simply returns to step 154, to select the next tag.

The procedure of steps 154–162 is repeated in an iterative fashion for each of the tags in the tag table of FIG. 4, and the corresponding data for each tag is retrieved from the profile, to reconstruct the font reference. Once all of the tags have been evaluated, as determined at step 154, the reconstructed reference is returned at step 164. If more than one index was in the list returned at step 152, the procedure of FIG. 8 is repeated for each such index, to reconstruct the font references for each of the matching fonts. These font references can then be used to select the actual fonts to be employed in the printing of the document.

Figure 9:
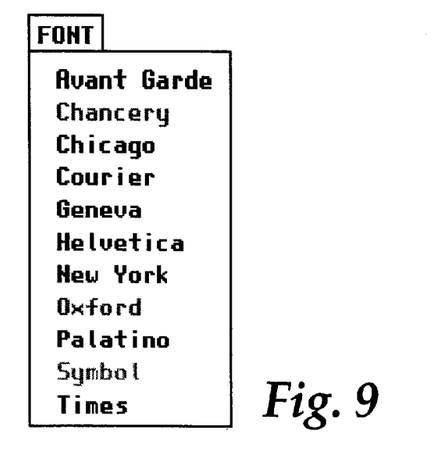
FIG. 9 is an example of a font menu that is created with the use of a font profile.

In addition to its use as an aid in the selection of fonts that are available at a particular site, the font profile can also be employed by an application programming interface which carries out the function of building font menus and other font selection mechanisms. For instance, an application programming interface for a word processing or desktop publishing program at the publisher's site 10 can select font names from the appropriate data table in a font profile provided by a service bureau. These names are used to construct a menu of available fonts. As documents are created within the application, the user is only able to select fonts which are supported by the service bureau that provided the font profile. For instance, FIG. 9 illustrates an example of a font menu that might be displayed by such an application. This menu lists all of the fonts that are available on the computer system where the application is running. However, some of these fonts are not included in the font profile that was received from another computer system, such as a remote service bureau. Consequently, the fonts which are not available at the remote system are displayed in a lighter color the menu, e.g. they are grayed out, to indicate that they cannot be selected for se within the current application. In the illustrated example, the three fonts "Chancery", "Oxford" and "Symbol" are grayed out to indicate that they are not available at the service bureau, and should not be used. In this manner, synchronization between a document's fonts and those available at the service bureau is achieved at the time that the document is being created.

The foregoing description of the invention has been made with reference to its implementation in a service bureau environment. However, the practical applications of the invention are not limited to this particular situation. Rather, the principles of the invention can be incorporated into a variety of different mechanisms that employ fonts. For example, the font synchronization capability can be incorporated into any type of word processing or desktop publishing application that is used to create documents. As the document is being saved to a file, a font reference can be created for each font employed in the document, and stored as part of the file, e.g. in a font profile. Subsequently, when the document is opened within the same application, or another application, its font references are compared against the font references for fonts that are available on the system in which the file is opened. If there is a mismatch, the user can be provided with a warning before attempting to edit or print the document on that system.

In other applications, the features of the invention can be incorporated within font management utilities and pre-press utilities, to enable a publisher to check the contents of a publication before it is transmitted to a pre-press operator. Another possible application of the invention is to incorporate its features within a printer driver, to confirm that the fonts available within a given printer are the same as those which were used to create a document being sent to that printer.

In summary, therefore, it can be seen that the present invention provides a mechanism which enables an unambiguous determination to be made whether a font to be used by a given computer resource which is handling a document is the same as that which was or will be employed by another resource which handles the document. Through the use of a number of different elements of data that pertain to a font in the creation of a font reference, and performing a matching operation separately on each type of data element, the system of the present invention is able to identify not only whether two fonts are different, but how they differ from one another as well. With such information, a user can make an informed decision whether to employ a particular font in the creation and/or printing of a document.

It will be appreciated by those of ordinary skill in the art that the present invention can be embodied in other specific forms without departing from the spirit or essential characteristics thereof. For instance, it is possible to compute two or more checksums for each data type, using different respective checksum algorithms, and perform a separate matching operation on each checksum, as independent measures of the identity of the data type values for two font references. The presently disclosed embodiments are therefore considered in all respects to be illustrative, and not restrictive. The scope of the invention is indicated by the appended claims, rather than the foregoing description, and all changes that come within the meaning and range of equivalence thereof are intended to be embraced therein.

What is claimed is:

1. A method for determining the degree of correspondence between two fonts, comprising the steps of:

generating a font reference for each of two fonts, wherein each font reference contains multiple data type values that correspond to predetermined properties of a font itself, and wherein at least a plurality of said data type values are computed from quantifiable ones of the predetermined properties of only a respective font;

comparing data type values of one font reference with the corresponding data type values of the other font reference;

determining whether all of the compared data type values of one font reference match the corresponding data type values of the other font; and providing an indication whether the compared data type values were determined to match.

2. The method of claim 1, wherein said indication identifies properties of a font that correspond to data type values that were determined not to match.

3. The method of claim 1 wherein said computed data type values comprise checksum values.

4. The method of claim 1 wherein some of said data type values comprise text strings of variable length.

5. The method of claim 1 further including the step of providing an identification of certain ones of said properties for a given comparison, and performing said comparing step only with respect to those data type values which are associated with the identified properties.

6. The method of claim 1 wherein each data type has an associated probability that a match will fail for that data type, and said comparing step is performed sequentially for said data types in order of their associated probabilities.

7. The method of claim 6 wherein said comparing step is terminated upon determining that one of said data type values does not match.

8. The method of claim 1 further including the step of storing an indication whether a lack of data in a font reference constitutes a mismatch, and selectively continuing with said determining step or terminating said method upon detecting a lack of data, in dependence upon said indication.

9. A method for identifying two fonts that match one another, comprising the steps of:

generating a font reference for each of a plurality of fonts, wherein each font reference contains multiple data type values that respectively correspond to predetermined properties of one font itself, and at least one of the multiple data type values is computed from at least one quantifiable property of only the predetermined properties;

storing the font references for the plurality of fonts in a font profile;

retrieving the font reference for a given font that is to be matched with another font;

comparing data type values in the font reference for the given font with corresponding data type values of plural font references stored in said font profile;

determining whether all of the compared data type values for the given font match all of the corresponding data type values of a font reference stored in said font profile; and identifying a font reference stored in said font profile whose data type values match those of the font reference for the given font.

10. The method of claim 9, wherein said font profile contains a plurality of data tables which respectively correspond to the data types whose values are contained in the font references.

11. The method of claim 10, wherein said comparing step comprises the step of comparing a data type value from the font reference for the given font with values stored in a corresponding one of said data tables.

12. The method of claim 10 wherein said comparing step provides an index that indicates the locations within said data tables of data type values that match corresponding data type values of the font reference for the given font, and wherein said identifying step includes the step of reconstructing a font reference from said index.

13. The method of claim 12 wherein a font reference is reconstructed by retrieving data which is stored in each of said tables in the font profile at a location indicated by said index.

14. The method of claim 10 further including the step of generating a font menu within an application program, which identifies the fonts whose font references are stored in said font profile.

15. The method of claim 14 further including the step of limiting fonts used in a document created with said application program to those fonts whose font references are stored in said font profile.

16. The method of claim 9 further including the step of storing an indication whether a lack of data in the profile constitutes a mismatch, and selectively continuing with said determining step or terminating said method upon detecting a lack of data, in dependence upon said indication.

17. The method of claim 9 wherein at least some of the data type values in a font reference are computed from quantifiable properties of a font.

18. The method of claim 17 wherein said computed data type values comprise checksum values.

19. A system for identifying the correspondence of two fonts to one another, comprising:

a data processor that receives font data that defines predetermined properties of a font itself and computes data type values associated with the font from said font data, wherein each of said data type values associated with one of the fonts is computed based on at least one respective predetermined property of the one font and not on predetermined properties of another font;

a memory that stores the data type values computed from font data in font references that respectively pertain to different fonts;

a matcher that compares data type values of one font reference with corresponding data type values of another font reference; and a reporting mechanism that provides an indication whether the compared data type values match.

20. The system of claim 19 wherein said reporting mechanism identifies properties of a font that correspond to data type values that were determined not to match.

21. A system for identifying matching fonts, comprising:

a data processor that receives font data that defines predetermined properties of a font itself, and generates a font reference containing data type values that are associated only with said font and computed from said font data;

a memory that stores a font profile comprising data type values contained in a plurality of font references that respectively pertain to different fonts;

a matcher that compares data type values of a font reference for a given font with corresponding data type values stored in said font profile; and a reporting mechanism that provides an indication of fonts represented in said font profile that match said given font.

22. The system of claim 21 wherein said font profile contains a plurality of data tables which respectively correspond to the data types whose values are contained in the font references.

23. The system of claim 22 wherein said matcher compares a data type value from the font reference for the given font with values stored in a corresponding one of said data tables.

24. The system of claim 22 wherein said reporting mechanism provides an index that indicates the locations within said data tables of data type values that match corresponding data type values of the font reference for the given font, and further including means for reconstructing a font reference from said index.

25. The system of claim 24 wherein said reconstructing means retrieves data which is stored in each of said tables in the font profile at a location indicated by said index to reconstruct said font reference.

26. The system of claim 21 further including an application programming interface which generates a font menu within an application program that identifies the fonts whose font references are stored in said font profile.

27. The system of claim 26 wherein said application programming interface limits fonts used in a document created with said application program to those fonts whose font references are stored in said font profile.

28. A computer readable medium containing a program that executes the steps of:

generating a font reference for each of two fonts, wherein each font reference contains a plurality of data type values that are computed from quantifiable properties of a respective one of the fonts and not from the other remaining font;

comparing data type values of one font reference with the corresponding data type values of the other font reference;

determining whether all of the compared data type values of one font reference match the corresponding data type values of the other font; and providing an indication whether the compared data type values were determined to match.

29. The computer-readable medium of claim 28 wherein said indication identifies properties of a font that correspond to data type values that were determined not to match.

30. The computer-readable medium of claim 28 wherein said computed data type values comprise checksum values.

31. A computer readable medium containing a program that executes the steps of:

generating a font reference for each of a plurality of fonts, wherein each font reference contains multiple data type values that respectively correspond to predetermined properties of the font itself; wherein at least one of the data type values of each font reference is computed based on at least one of the corresponding predetermined properties of a respective font and not based a predetermined property of another of the plurality of fonts;

storing the font references for the plurality of fonts in a font profile;

retrieving the font reference for a given font that is to be matched with another font;

comparing data type values in the font reference for the given font with corresponding data type values of plural font references stored in said font profile;

determining whether all of the compared data type values for the given font match all of the corresponding data type values of a font reference stored in said font profile; and identifying a font reference stored in said font profile whose data type values match those of the font reference for the given font.

32. The computer-readable medium claim 31, wherein said font profile contains a plurality of data tables which respectively correspond to the data types whose values are contained in the font references.

* * * * *